United States Patent
Bennett

(10) Patent No.: US 8,661,028 B2
(45) Date of Patent: *Feb. 25, 2014

(54) WEB BROWSER ACCESSIBLE SEARCH ENGINE THAT IDENTIFIES SEARCH RESULT MAXIMA THROUGH USER SEARCH FLOW AND RESULT CONTENT COMPARISON

(71) Applicant: James D. Bennett, Hroznetin (CZ)

(72) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,314

(22) Filed: Jan. 29, 2013

(65) Prior Publication Data

US 2013/0144861 A1 Jun. 6, 2013

Related U.S. Application Data

(63) Continuation of application No. 12/368,978, filed on Feb. 10, 2009, now Pat. No. 8,364,664.

(60) Provisional application No. 61/052,345, filed on May 12, 2008.

(51) Int. Cl.
*G06F 17/30* (2006.01)

(52) U.S. Cl.
USPC .......................................... 707/722

(58) Field of Classification Search
None
See application file for complete search history.

(56) References Cited

U.S. PATENT DOCUMENTS 7,890,499 B1 * 2/2011 Boswell ..................... 707/722

* cited by examiner

*Primary Examiner* — Rehana Perveen
*Assistant Examiner* — Alexander Khong
(74) *Attorney, Agent, or Firm* — Garlick & Markison; Bruce E. Garlick

(57) ABSTRACT

An Internet infrastructure contains a search server that delivers search result pages of web sites to client devices based upon a search string. Maxima categories are provided that sort search results or web pages based upon popularity and/or context similarity. A web browser contained within a client device is coupled to display various search result pages of web sites delivered by the search server. A maxima determination module within the search server responds to the delivery of the initial search string by first categorizing search results applicability to the search string on the basis of maxima or by generating maxima categories with search results contained therein that correlated to the search string. These search results within each applicable maximum are then sorting on the basis of popularity within each of the maxima categories to effectuate popularity ranks for each search result or web page.

18 Claims, 9 Drawing Sheets

FIG. 2

Search Engine's Web Page (www.Search_Engine.com) 221

Enter Search String: 271 | Restaurant in ABC City 273 | Search
              281                                      283

1. Restaurant NNN [Maxima Group (Category): I- Popularity: 1] 251
   - - - - - - - - - - - - - - - - - - - - - - - - - -
2. Restaurant MMM [Maxima Group (Category): I- Popularity: 2] 252
   - - - - - - - - - - - - - - - - - - - - - - - - - -
3. Restaurant KKK [Maxima Group (Category): I- Popularity: 3] 253
   - - - - - - - - - - - - - - - - - - - - - - - - - -
4. Restaurant JJJ for Sale [Maxima Group (Category): II- Popularity: 1] 254
   - - - - - - - - - - - - - - - - - - - - - - - - - -
5. Restaurant RRR for Sale [Maxima Group (Category): II- Popularity: 2] 255
   - - - - - - - - - - - - - - - - - - - - - - - - - -
6. Restaurant PPP Furnishing [Maxima Group (Category): III- Popularity: 1] 256
   - - - - - - - - - - - - - - - - - - - - - - - - - -

Prev 285    Next 289    Refine Search 291

Note: This search engine provides category based adaptive search results, based on 'maxima grouping' and 'user interaction patterns'. Each time the "Refine Search" button is pressed, an adaptively refined search results list based on user interaction is produced.

Client's Browser 235

Search Engine's Web Page (www.Search_Engine.com) 321

Enter Search String: 371  | Restaurant in ABC City 373 |  [Search] 383

1. Restaurant – Free Encyclopedia [Maxima Group (Category): VIII - Popularity: 1] 351
2. ABC City Restaurant Association [Maxima Group (Category): IX - Popularity: 1] 352
3. Jobs in Restaurants [Maxima Group (Category): X - Popularity: 1] 353
4. Search Restaurant in ABC City [Maxima Group (Category): XI - Popularity: 1] 354
5. Restaurant XXX [Maxima Group (Category): I - Popularity: 3] 355
6. Restaurant YYY [Maxima Group (Category): I - Popularity: 4] 356

[Prev] 385   [Next] 389   [Refine Search] 391

Note: This search engine provides category based adaptive search results, based on 'maxima grouping' and 'user interaction patterns'. Each time the "Refine Search" button is pressed, an adaptively refined search results list based on user interaction is produced.

Client's Browser 335

Search Engine's Web Page (www.Search_Engine.com) 421

Enter Search String: 471  | Restaurant in ABC City 473 | 481   [Search] 483

1. Restaurant XXX [Maxima Group (Category): I- Popularity: 3] 451
2. Restaurant YYY [Maxima Group (Category): I- Popularity: 4] 452
3. Restaurant KKY [Maxima Group (Category): I- Popularity: 5] 453
4. Restaurant YYK [Maxima Group (Category): I- Popularity: 6] 454
5. Restaurant RRY [Maxima Group (Category): I- Popularity: 7] 455
6. Restaurant PPX [Maxima Group (Category): I- Popularity: 8] 456

[Prev] 485   [Next] 489   [Refine Search] 491

Note: This search engine provides category based adaptive search results, based on 'maxima grouping' and 'user interaction patterns'. Each time the "Refine Search" button is pressed, an adaptively refined search results list based on user interaction is produced.

Client's Browser 435

FIG. 4

WEB BROWSER ACCESSIBLE SEARCH ENGINE THAT IDENTIFIES SEARCH RESULT MAXIMA THROUGH USER SEARCH FLOW AND RESULT CONTENT COMPARISON

CROSS REFERENCES TO PRIORITY APPLICATIONS

The present U.S. Utility patent application claims priority pursuant to 35 U.S.C. §120, as a continuation, to the following U.S. Utility patent applications which are hereby incorporated herein by reference in their entirety and made part of the present U.S. Utility patent application for all purposes:
1. U.S. Utility application Ser. No. 12/368,978, entitled "Web Browser Accessible Search Engine that Identifies Search Result Maxima Through User Search Flow and Result Content Comparison,", filed Feb. 10, 2009, now U.S. Pat. No. 8,364,664, which claims priority pursuant to 35 U.S.C. §119(e) to the following U.S. Provisional patent application which is hereby incorporated herein by reference in its entirety and made part of the present U.S. Utility patent application for all purposes:
   a. U.S. Provisional Application Ser. No. 61/052,345, entitled Web Browser Accessible Search Engine that Identifies Search Result Maxima Through User Search Flow and Result Content Comparison," filed May 12, 2008.

BACKGROUND

1. Technical Field

The present invention relates generally to a computer device that performs on-line searches; and, more particularly, to computer-based data searching adaptively provides search results to a user based on user interaction over time.

2. Related Art

Search engines are a popular way of searching for search results or an unknown website based upon a search string entered by a user. Search engines today are very popular and provide many users with a way to search for websites that provide the user with desired information, programs, downloads, or entertainment. A typical search engine identifies received a user search string, searches a database for search results related to the search string, and compiles a search result list. The search result list is often selected based on hit accuracy and presented to the user based on prior user selection popularity. "Hit accuracy" is determined by computing a relevance that the search result has to the search string. If the search result seems sufficiently relevant to the search string, that search result is selected and placed in the search result list. "User selection popularity" identifies the items that are most viewed or most selected by other users. Since many users view these search results, it is assumed that these search results are more desired by other users as well. Therefore more "popular" search results within the search result list are presented first to the user first. The results are typically displayed in groups of 10 or so. To get more search results, a "next" button can be pressed to allow the user to see the next 10 search results in a search result list, and so on. If users don't seem to find what they were looking for, subsequent selections are accessible via the "next" button are required for viewing, whereby the user may have to search through hundreds or thousands of search result to find the results they find interesting. Each subsequent search result page moved to by the user can provide more unrelated websites, thus wasting user's valuable time. Changing the search string is likely to result in the same kind of random hunt for search topics of interest.

As an example, let's assume someone entered "Angelina Jolie" as a search term. The search engine would go off and find all search results that are highly correlated to the search term "Angelina Jolie" and place them into a search result list. Then the search engine will process which search results were most popular among users and present the current search user with the top 10 or so most popular sites. Today, this "Angelina Jolie" search would result in 10 search results being listed regarding Angelina's adoption of a new daughter. This news is the most current and most important, and this information floods to the top of the search list drowning out all other information that may be relevant to the user. Therefore, if the user wanted to find what movies Angelina starred in through the 1990s, or information on her humanitarian efforts, or wedding pictures of her and Brad Pitt, etc., the user would have to scan many search results to get to the information they seek, if they even can find that information in the large search result list that was generated sequentially for presentation to the user. Unfortunately, this process of working down through many search result in one dimension from the most popular sites or search results to the least popular may not be feasible in situations where there are thousands of hits and the most popular search results are not always a perfect indicator of your interests. To remedy this situation, a user is often forced to begin adding what might prove to be unreasonable search terms that: a) attempt to screen (NOT function) the more popular search results (e.g., in the Angelina example above, entering "not adoption" into the search string) to allow the less-popular targets to "bubble to the top"; and/or b) attempt to pluck out the exact information needed in a sea of information by deriving very complex search terms directly. Often, this isn't feasible and the search approach wastes time without providing successful yield. These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to an apparatus and various methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 2 illustrates, in a block diagram, a snap shot of a first search result page identified based on a search string delivered by a web browser, wherein the first search result page contains search result maxima categories and web pages sorted on the basis of a two tier approach where popularity ranked search results are presented within each of the top tier maxima categories;

FIG. 3 illustrates, in a block diagram, a snap shot of a second search result page that could results after the search result page of FIG. 3 based upon 'next' button clicking in the first search result page of FIG. 2, wherein the second search result page contains a next few search result maxima categories based on user interaction (if any) with the search results in FIG. 2;

FIG. 4 illustrates, in a block diagram, a snap shot of a third search result page based upon a user clicking on a 'refine search' button in the first search result page of FIG. 2 and/or the processing of user interaction data, wherein the third search result page contains refined search results with more focused search result maxima categories;

DETAILED DESCRIPTION OF THE DRAWINGS

Figure 1:
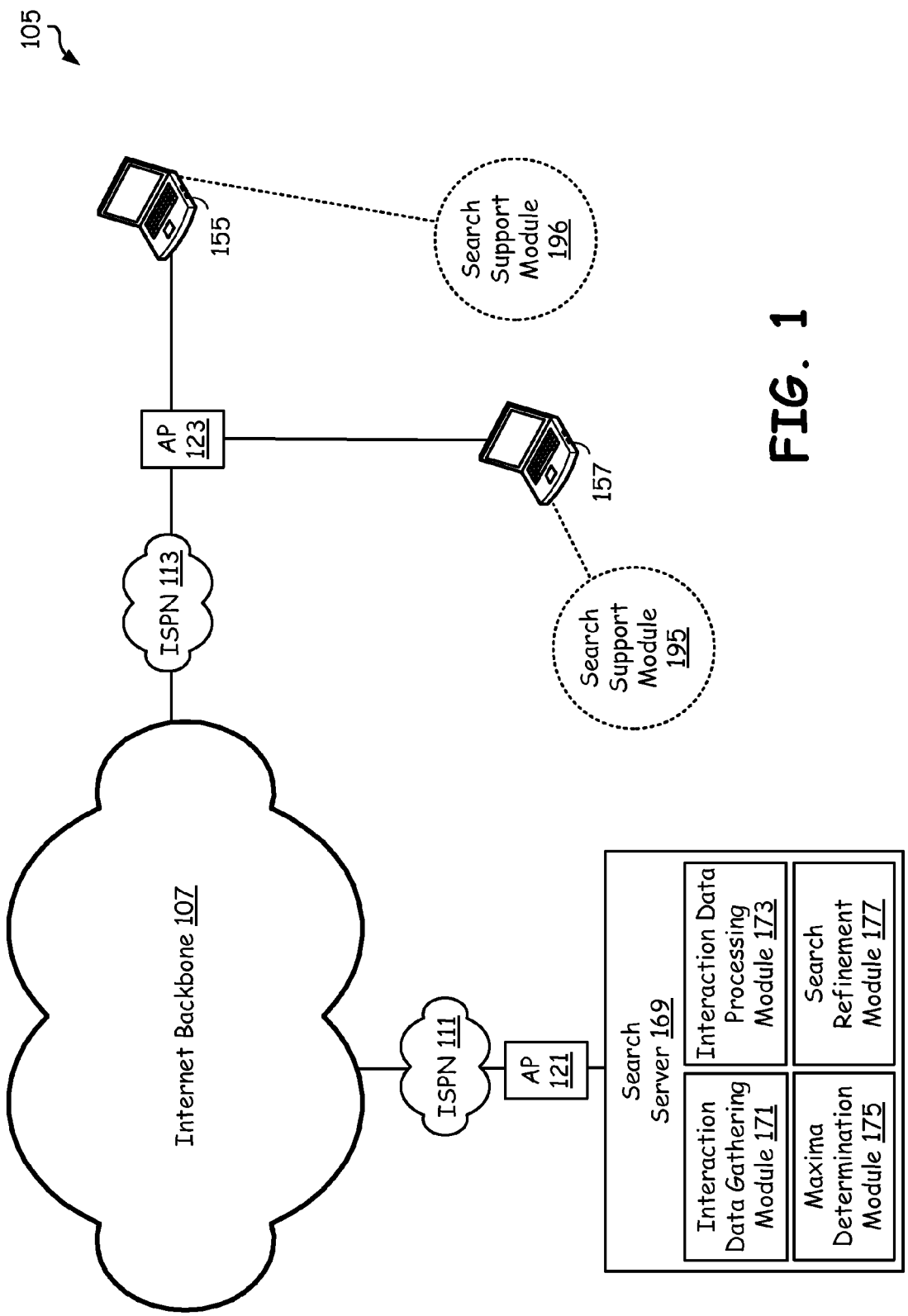
FIG. 1 illustrates, in a schematic block diagram, an Internet infrastructure containing a plurality of client devices and a web browser accessible search server, wherein the search server identifies more optimal search result maxima over time through user search flow and ongoing result content comparison.

FIG. 1 is a schematic block diagram illustrating an Internet infrastructure 105. The infrastructure 105 contains a plurality of client devices 155 and/or 157. In FIG. 1, only two client devices are shown for simplicity. It is important to note that the infrastructure 105 can contain as few as one computer or one client device, or on up to millions or billions of client devices. These client devices can be personal computers, other servers (maybe similar to search server 169), handheld devices, consumer devices (televisions, appliances, automobiles, etc.), as well as other search-capable devices. These client devices 155 and 157 contain software and/or hardware referred to in FIG. 1 as the search support modules 195 and 196. These software modules can be totally isolated and separate between client devices 155 and 157, or may be linked over the connectively infrastructure show in FIG. 1, in a peer-to-peer manner or another manner. Meaning, the modules 195 and 196 may be independent of each other, or interoperate with each other over communication channels.

The illustration of internet infrastructure 105 shows an internet backbone 107 communicatively coupling the client devices 155 and 157 to the search sever 169 via ISPNs (Internet Service Providers Networks) 111 and 113, and APs (Access Points) 121 and 123. Note that while a specific connectively architecture is show here in FIG. 1, many different Internet infrastructures, connectivity schemes, and networks exist. These networks can be both public and private, and wired, optimal, wireless, or some combination thereof. All these Internet and/or intranet schemes can work with the processes and structures taught herein. Infrastructure 105 also contains web browser accessible search server 169. The search server 169 contains interaction data gathering module 171. This module 171 gathers data from search support modules 195 in the client device 155 or 157 so that user side interaction information may be processed by search side operations. An interaction data processing module 173 is also a part of server 169. This module 173 analyzes the user interaction data gathered or received by the module 171 and arrives at conclusions regarding how to prioritize the many maxima categories pertaining to search results, and prioritize popularity ranks within these selected maxima categories. A maxima determination module 175 within the server 169 selects uses the maxima and popularity prioritization from the module 173 to identify specific search results within certain selected maxima categories that have a certain popularity rank, whereby such results can be selected and prioritized for display on the subsequent search result page. In other words, the processing and selection of search results per module 175 is based upon the analyses of the interaction data processing module 173 via data gathered per module 171. Search server 169 also contains a search refinement module 177 to handle the functionalities of 'refine search' buttons. Module 177 allows, in one embodiment, the user to force certain server side functions to occur, where these server functions can take current or additional input from the user and/or their interaction with the browser/results to refine search quality. It is important to note that the modules 171-177 of FIG. 1 may be separate and distinct modules within the search server 169, or may be functions that are performed by the same one or more CPUs within the same memory subsystem of a general purpose computer architecture that powers the server 169. Often, the modules 171-177 are software programs that reside in memory within server 169 and run on the same or similar central processing units (CPUs) within the server 169

In one embodiment, the search server 169 is the structure that is used to identify search result maxima through user search flow and search result content comparison. Specifically, upon receiving a search string from one client device, say device 155, the search server 169 determines one or more of data structures, search words, search data, definitions of the important words of the search string, etc., and based on these definitions creates the search result lists in a way where they are organized in terms of maxima categories (or, search result maxima categories). Search results are found based on correlation of search results, or the more high level maxima categories, to the search data/terms the server 169 receives or derives. A highly correlating few of these maxima categories are chosen, and within each maxima category first few search results are chosen based on popularity, which is then assembled into a sorted or prioritized search result list. In other words, a few highly correlated maxima categories are selected and popularity ranks are provided or derived for each web page therein, and the results within various highly-correlated maxima that have sufficient popularity are delivered as a first search result page to the web browser of the client device 155 (a snapshot of delivered exemplary first page is illustrated in FIG. 2).

In one embodiment, the search string is processed and used to identify search maxima that are of interest. Those maxima are then searched for search results that correlated highly to the search string and/or are highly popular. Popularity may be relative compared to other viable search results in one or more maxima or may be sufficient when a certain popularity value threshold is crossed. The search results within selected pertinent maxima that have sufficient popularity are prioritized for early presentation to the user. In this embodiment, the maxima for search results are already determined and stored within a database coupled to the server 169. In other words, as search results are added to the Intranet or search space, the server 169 or other computers like it, will process the search results into a hierarchy of maxima and store them in a database. In another embodiment, search results may be found on a search-by-search basis. Then these highly correlating search results can be grouped into maxima categories post-search or after the search result list is generated. In this case, maxima need not be pre-derived at the server level, maxima can be created post-first-search once a large list of search results are found to be correlated to the search string. In this case, the maxima generated post close can be processed to see what maxima seem to best indicate content that is valued to the user. These identified high-impact maxima can then be scanned for the most popular search results, and those search results, in those top maxima are assembled for presentation to the user. Now, as the user starts and continues to interface with the server presented search results, the user interaction with search results and with the devices 157 and 155 may be captured and processed along with direct and indirect input by the user. Over time, this information may be used to refine search results, maxima, and popularity relevant to this user and their search. Several scenarios are considered with regards to the user interaction with the first page of search results delivered. If the user of the client device 155 glances through the first search result page (see FIG. 2 for an example) quickly and presses the next button, then the server or client device can assume the user was not too interested in that first scope of search results. In that case, the search server 169 delivers the best search results in the next few of the maxima categories identified as relevant by the search engine. In one embodiment, the best search results in these "next best" maxima are the first few search result that have highest popularity and these highly popular search results within the next best maxima are presented for processing by the user via the client device 155.

However, if the user quickly opens one of the web pages in the first search result page or opens a search result on the first page and spend a lot of time processing data in that result and following links within that search item, then that maxima category in which the user was spending time is also included in the second search result page (a snapshot of delivered exemplary second page is illustrated in FIG. 3). With regards to the second page delivered, if the user of the client device 155 clicks on one of the web pages of the search result list and stays there for a considerable while, then a third search result page is delivered that delivers even more content similar to the scope viewed by the user in the first and second page. The third search result page contains a next few of the sorted list of web pages or search results on the basis of popularity from the maxima category from which user selected a web page in the second search result page and stayed there for a considerable while (a snapshot of delivered exemplary third page is illustrated in FIG. 4). Other scenarios of narrowing down the search results to suit user needs, by using maxima categories, are also contemplated. In any event, as time goes on and the user selects and interacts with search results, this information is captured and processed to zoom hierarchically in on maxima, popularity indicators within maxima, and search items within maxima within popularity indicators to continually provide to the user more and more search results that seem to focus and peak their interest. A search support module 195, installed in the client devices 155 and 157, monitors user interaction with the search page. The search support module 195, in specific, generates user interaction data and statistics. These may include identification of the maxima category in a user-displayed search result page(s) with which the user interacted, how long the web page is opened, what content was viewed in the page, how many links were followed within the page or search result, etc. The search support module monitors the user's interaction between and within search results from the beginning of delivery of a search result page until a button (e.g., next, back, refine search, etc.) is clicked. When the user goes to another page or interface, user interaction can continually be captured for new and other search results, whereby the "intelligence" of what the user desires can be iteratively improved over time. This user interaction data or other data derived from user interaction data is transferred to the search server periodically or upon press of the buttons (e.g., refine search button) provided with the search result pages.

In another embodiment of the present invention, another adaptive approach is used by the search server 169 (which involves interaction with data processing module 173 and search refinement module 177, to be specific). This method uses the words, content type, etc of the items that the user seems to interact positively with to help identify further search terms for selecting subsequent most likely brief hits. For example, instead of dedicating 100% of next 10 brief selections for this approach of adaptation, possibly 30% might be allocated based on the type of content the user is attracted to, or the type of content correlating to the search terms.

In another embodiment of the present invention, each time users of the client devices 155 and 157 interact with the search server 169 using similar search strings, the search server 169 gathers user interaction data/statistics that are used to generate maxima categories. Also (or alternatively) the search server 169 compares the content of all of the hits and constructs common maxima category, some being more and some less popular. Meaning, the maxima accessible or created by the search server can change over time as one or more users interact with the search data/results. Together with history and content, the search server 169 can replace the traditional popularity ordered search results with several of the most popular hits from each of the more popular maxima categories on the first 10 results. Selection by the user of a one of the maxima category hits will cause the generation of the next 10 hits of the further most popular hits within that maxima category.

It is also important to note that the interaction data processing module 173 can give consideration to whether or not an offered search result or maxima is or is not soliciting interest. In other words, the module 173 can also monitor how many "hit opportunities" of a given maxima, search result, or category have been offered without eliciting user interest. For example, a first hit group might contain 3 search items from maxima category 1, 2 search items from category or maxima 2, and 1 search item from each of maxima categories 3-7. If, in this fact pattern, the user does not interact with any of the results, the second set of hits might comprise 1 search result from each of a next (or remaining) category 8-12, 2 search results from the previous highly-selected category 1, and 1 search results (less hits) from categories 2, 3 and 4. In subsequent next pages, the search results for maxima 1 and 2 may be phased out as the user shows no interest. No interest and/or the pressing of the 'refine search' button might yield a next search result list page with 1 search results from category 1, 3, 11 and 12, and 2 from each of categories 8-10. Displaying of different levels of interest in different maxima and with different content may cause a modification of this approach and the results it generates. A selection and very quick window closure might actually identify a lack of interest that is used to decrease the likelihood that such maxima are displayed, for example. In the alternative scenario, vigorous selection and time spent within a maxima will allow the system to detect that interest and allow the server to put greater emphasis on similar types of search result in the same or similar maxima. For example, lets again assume that a first hit group contains 3 search items from maxima category 1, 2 search items from category or maxima 2, and 1 search item from each of maxima categories 3-7. If the user spends the next hour and half processing the search result in maxima category 4 and ignores all the other search results before pressing the next button, the server may assume that the maxima category 4 will contain a lot more information that is of use to the user. Therefore, the next search results list page may contain 5 listing from maxima 4 and 5 listings from other maxima. If the interest continues in maxima 4, eventually that maxima will drown out all other listings in the search list page and only maxima 4 results will be displayed as the next button is pressed.

In these cases where the user is focusing in one or a couple of top level maxima to the exclusion of other maxima, the search system can focus hierarchically down one level. As a user drills into maxima 4, there are sub-maxima with that maxima 4 category. Let's call these maxima 4A, 4B, 4C, and 4D. If, through the same type of processing already discussed, the system 105 determines that the user is focusing more on sub-maxima 4B and ignoring the others, then the system will begin, through detecting this emphasis of user interaction, favor sub-maxima 4B search results in later next button pages, to the exclusion of other search results. This hierarchical focusing of the user onto search results that peak their interest in certain maxima and sub-maxima can continue iteratively through many levels of maxima and progressively more focused sub-maxima in a tree type structure.

As another example, the search server 169 may create (again, dynamically as searches are performed, or in advance of searches being performed) maxima categories for a search word sequence including "restaurant" such that a maxima category associated with dining establishments is of top priority, a lesser prioritized maxima category associated with kitchen equipment, and even lesser prioritized maxima categories associated with restaurants for sale, franchises and restaurant furnishing companies. Maxima categories are identified by finding correlation between pages or searchable content and through tracking prior user search interactions identified based on past search selections. In this case, the search server 169 creates maxima categories accordingly, with to priority among maxima categories is to the dining establishments (refer to FIG. 2 for further description of this example).

Therefore, instead of delivering search result pages based on popularity hits which might yield the first 10 hits in the dining establishments maxima category, the search server 169 might deliver possibly three most popular results associated with the first maxima, followed by two most popular hits from the second most popular maxima, and one from each of the subsequent more popular maxima. Within each of these selected high level maxima, the search server delivers the web site listing based on web page popularities. In the alternative, it could also select based on the likelihood of a sub-maxima within the maxima being likely to be more "sticky" to the user than other sub-maxima in the selected maxima. If the user interacts with any of the briefed offerings, the search support module 195 records that event and subsequently upon pressing of 'refine search' button (or the next button, if the next button is selected to process this user interaction info) sends this user interaction data to the interaction data gathering module 171.

In one embodiment, such interaction is also timed, that is, the search support module 195 also records how long the user interacted with any of the briefed offerings. Further vectors associated with that interaction are also recorded by the search support module 195, e.g., if a user selects one brief description that opens then selects a hypertext link on that page, the search support module 195 records that vector and duration of the visit. When the user returns to the search results page and clicks on 'refine search' button, all of the activity recorded is used to tailor the subsequent search result pages. In one embodiment, this tailoring will not result in a page transition that results in all of the search results or maxima being replaced however. It may include adjusting the offering of 5 of the 10 displayed search maxima and popularity categories. In this example, 5 search results are provided using the user interaction data, and the other 5 provided search results are provided using a traditional approach for delivering the other 5. Meaning, this process of honing a user in onto user interesting content may be partially woven into the normal processing of providing search results to users via a known process. As the user continues through the results and records interactions, the search server may provide ever further tailoring of 50% or so of the results on a given page. To facilitate the user of the client device 155 or 157, the displayed search result page on the client devices 155-157 provides 'prev' (previous), 'next' and 'refine search' buttons as shown in FIG. 2. Other buttons that add functionality can also be added to the interface of FIG. 2, and some of these buttons may be removed while still providing many of the advantages of improved searching as discussed herein. The 'prev' button allows user to view the preceding page that was displayed just before the current search page that is on the screen. This button allows users to go back to preceding search result pages as needed. In this case, the search support module 195 begins to monitor activity again from the preceding page that is now once again displayed. The 'next' button moves the user on to the next search page full of a plurality of search results or links thereto. Upon pressing of the next button, the system provides a search result page that contain search results that have high popularity that were pulled from a few maxima categories that highly correlated to the users past interaction and search string. This next button may progress the user in a linear fashion to next search results that were already pre-determined to be provided when the first page was generated or the next button may use some of the user interaction processing to refine the search over time whereby the content for the second, third, and fourth pages of search results change as user input/interaction dictates those changes. So, in one embodiment, the next button will not take into account user interaction or provide a narrowed or refined search result list to the user based on server or client device process, and will only facilitate the user to proceed to the next search result page containing a next few search results within maxima categories that have a certain popularity based on earlier search string processing. In other embodiments, the next button takes into account the user interaction and data, and refined the presented search results within maxima and within popularity indicators to better present more meaningful and targeted search results to the user. The 'refine search' button provides an option to the user of the client device 155 or 157 to allow the search server 169 to use user interaction data and refine the search results. The refine search button will have more significant impact in a system that is programmed whereby the next button does not take into account user interaction. Nonetheless, even if the next button is attempting to identify better search results for the user based on user interaction, the refine search button may force the server to use a more aggressive approach to try to more quickly narrow in on search content the user is now interactive with. Meaning, if the user finds the search result that is amazing for their needs, the user can use that interaction and info to prompt for more aggressive searching down that path via the use of a button like the refine search button. In another embodiment, the refined search result page will contain fewer number of maxima categories than the preceding search result page, selected from the same maxima categories as in the preceding search result page when the refine search button is pressed.

Also, the web pages listed on the basis of popularity ranks may contain a next few sorted web pages within these listed maxima categories. More detailed description of the 'prev', 'next' and refine buttons can be found with reference to the FIGS. 2, 3, 4, 8 and 9. FIG. 2 is an exemplary block diagram illustrating a snap shot 205 of a first search result page based on a search string delivered by a web browser wherein the first search result page displays to a user certain search results within certain search result maxima categories sorted, provided, and selected based on popularity ranks for search results within each of the maxima categories. Specifically, the exemplary snap shot delivered is based upon a search string "restaurant in ABC city" 273 and the first search result page is delivered to the client's browser 235. The first (and all subsequent) search result web page(s) may contain a page title such as 'Search Engine's web page (www.Search_Engine.com)' 221, and 'search' 283, 'prev' 285, 'next' 289 and 'refine search' 291 buttons. In addition a text such as 'Enter Search String:' 271 and text box 281 is provided to facilitate user's search. A helpful note text that informs the user about the functioning of the search engine of the present invention, such as 'Note: This search engine provides category based adaptive search results, based on 'maxima grouping' and 'user interaction patterns'. Each time 'Refine Search' button is pressed, an adaptively refined search results list based on user interaction is produced.' may be provided with each of the search result web pages. In addition, the first search result page shown in FIG. 2 also contains a window containing a search result list, typically a list of 10 web links, numbered as 1, 2, 3 . . . 10. Any number other than 10 can be used of course. Out of these 10 web link results, the exemplary snap shot 205 produced search results from a first three maxima categories determined by the search server on the basis of popularity or context and/or relevance to the search string entered by the user. The first such maxima category is Maxima Category I, and three search results of Popularity 1, 2 and 3 are provided per web links 251, 252 and 253. In this snap shot of the first search result page, dinning establishments such as 'Restaurant NNN' 251, 'Restaurant MMM' 252, and 'Restaurant KKK' 253 are illustrated as the subject matter of the search results. A second maxima category contains Maxima Category II, with two search results of Popularity 1 and 2 provided via web links 254 and 255. That is, restaurants for sale such as 'Restaurant JJJ for Sale' 254 and 'Restaurant RRR for Sale' 255 are illustrated. Similarly, a third maxima category is shown as Maxima Category III, and displays one search results with a Popularity 1 via a web link 256. That is, restaurant furnishings shops such as 'Restaurant PPP Furnishing' 256 are illustrated. Subsequent maxima categories are not shown to simplify FIG. 2. Maxima category demarcation and other user interface graphics and presentation may be changed or may not be as illustrated in FIG. 2. FIG. 3 is an exemplary schematic block diagram illustrating snap shot 305 of a second search result page based upon 'next' button clicking in the first search result page of FIG. 2, wherein the second search result page contains next few search result maxima categories. In one embodiment, the next page 305 is simply the next search results that would have resulted in any ordinary search process. The search results presented would be the same search results that would have been presented in a one-dimensional prior art popularity based search, with little or no user input taken into account. In another form, the next operation may weave into the search results displayed in FIG. 3 via the processing of user input and the presentation of search results within more maxima and in more categories in with the user showed prior interest. The level of inter-weaving of this information into the next page can be anywhere between a low percentage (close to 0%) all the way up to 100% replacement or modification of search results based on user input/interaction within the content of FIG. 2.

The exemplary snap shot illustrated is based upon a search string "restaurant in ABC city" 373 and the second search result page is delivered to the client's browser 335, after the user clicks on 'next' button in the first search result page of FIG. 2. The second search result web page contains a page title such as 'Search Engine's web page (www.Search_Engine.com)' 321, and 'search' 383, 'prev' 385, 'next' 389 and 'refine search' 391 buttons, similar to FIG. 2. A text such as 'Enter Search String:' 371 and text box 381 is provided to facilitate user's search. It should be noted that each consecutive search page need not be of the same formatting or style. Other forms and formats of presentation to the user are possible, with different user interface (UI) options, and all those are available to the user in conjunction with the functionality and systems taught herein. The second search result page also contains a window containing the search result list, typically of 10 (or some other finite number N) of web links, search result tags, summaries, metadata, or like info, numbered as 1, 2, 3 . . . 10 (or N, as the case may be). Out of these exemplary 10 web link results, the snap shot 305 illustrates a next five maxima categories determined by the search server on the basis of popularity or context in a first embodiment. In a second embodiment, the system of FIG. 1 may have processed the user interaction and input and determined that the user spent some time, although not significant time and effort, within maxima I categories and completely ignored maxima I, II, and III categories in FIG. 2. Therefore, the next page of FIG. 3 still presents to the user some more content in maxima I but moves on from all the search results in maxima II and III (which could mean skipping over very numerous lists of search results for this search), to grab some search results from a next set of new maxima that highly correlated to the search result after maxima II and III, e.g., maxima VIII, IX, X, and XI. Note that since the most popular class of references within the hierarchy of maxima I did not really interest the user significantly, but interested the user so some extent, the next two popularity hierarchies within maxima I are presented in FIG. 3 to better attempt to "tease out" what the user may be interested in from this maxima I.

Therefore, the first such maxima category contains Maxima Category VIII, popularity 1 web link 351. In this snap shot of the second search result page a 'Restaurant—Free Encyclopedia' 351 web link is illustrated. A second maxima category contains Maxima Category IX, Popularity 1 web link 352. This entry is 'ABC City Restaurant Association' 352, as illustrated. A third maxima category contains a Maxima Category X, Popularity 1 web link 353. This is shows as 'Jobs in Restaurants' 354, as illustrated. A fourth maxima category contains Maxima Category XI, Popularity 1 web link 354. This entry is 'Search Restaurant ABC City' 354, and is illustrated in FIG. 3. Similarly, a fifth maxima category contains Maxima Category I, with two search results or elements listed as Popularity 3 and 4 web links 355 and 356. Links 355 and 356 relate to dining establishments, a topic or category continued from first search result page of FIG. 2. These entries are 'Restaurant XXX' 355 and 'Restaurant YYY' 255, as illustrated. Subsequent maxima categories are not shown for ease of illustration. Maxima category demarcation as illustrated in FIG. 3 may not necessarily be shown to the user, many different form of providing the data and a user interface to a user are possible and within the scope of the functions and systems taught herein. FIG. 4 is an exemplary schematic block diagram illustrating snap shot 405 of a third search result page. In one embodiment, this FIG. 4 is based upon 'refine search' button clicking in the first search result page of FIG. 2. In another embodiment, FIG. 4 can be used to show what happens if the next button is pressed and the next button is functioned to interweave substantial new user-interaction-based search results into the output information provided to the user. Basically, FIG. 4 shows the use of user interaction data to provide more meaningful content to the user through hierarchical processing of several categories, which in this embodiment are a top level maxima (including sub-maxima) category and a popularity second hierarchy embedded within the maxima and sub-maxima. In FIG. 4, is it assumed that the user spent a significant amount of time within the maxima I category with spending no time in the maxima categories II and III while perusing the data in FIG. 2. Given this user interaction and input, the third search result page contains refined search results with fewer (only one in this example) search result maxima categories that focus on the user's apparent interest.

The third search result web page contains a page title such as 'Search Engine's web page (www.Search_Engine.com)' 421, and 'search' 483, 'prev' 485, 'next' 489 and 'refine search' 491 buttons. A text such as 'Enter Search String:' 471 and text box 481 is provided to facilitate user's search. The third search result page also contains a window containing search result list, typically of 10 (or some other finite number N) web links, numbered as 1, 2, 3 . . . 10. This search result page is refined from the first search result page of FIG. 1 upon clicking the button 'refine search', or shows a 'next button' function that has woven into it the function of interweaving significant new search results into the next page content based on user interaction and user input. In the embodiment that uses the 'refine search' button or input to get to new user-interaction-based content, the search server either gathers or received previously gathered user interaction data upon the clicking of the refine button. This user interaction data may be based on interactions by the user within FIG. 1 or any other finite or complete number of search results, search lists, or search pages previously presented to the user. Furthermore, these results for FIG. 4 may be processed with additional user information other than the user interaction from this one search. Other information from prior searches may be used. Information from other users that performed similar searches may be used to direct the user down a common search path followed by many other users looking for the same type of search string info, possibly in or around the same time periods. Also, a user profile or search context may be used to refine search results. For example, if the search is performed on a local search space within Yahoo finance, it can be assumed financial data is sought. In another mode, if the user's profile shows he is interested in skydiving, the search may progress the search more in the direction of skydiving if the search string seems to warrant that conclusion. To illustrate the combination of context and user profile, a surgeon at a local hospital with a user profile identifying him an orthopedic surgeon may be performing a search during work hours on a computer ID that identifies his work machine, whereby it can be assumed he is seeking work-related medical information.

Figure 5:
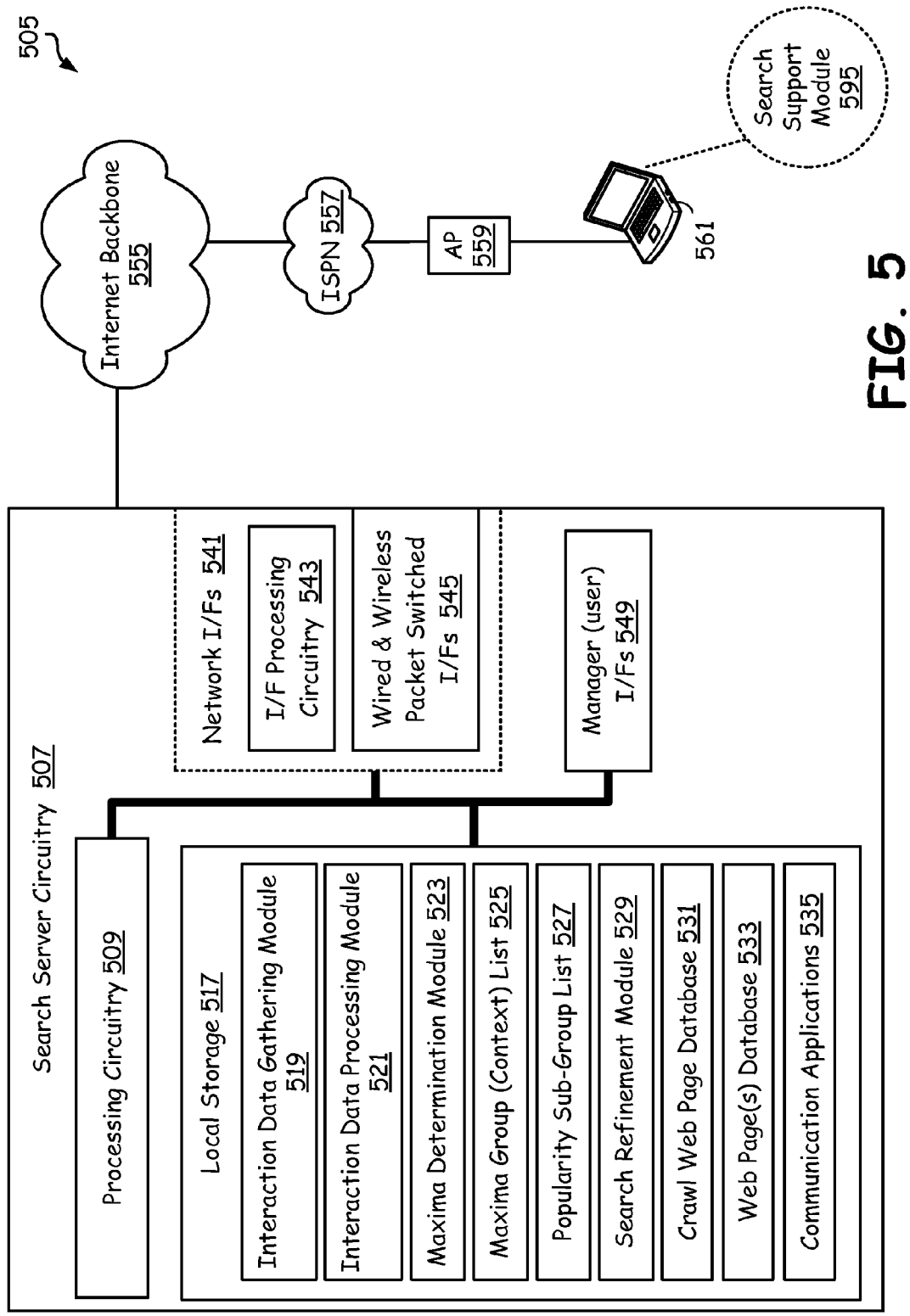
FIG. 5 illustrates, in a schematic block diagram, a more detailed structure and operation of the search server first introduced in FIG. 1.

Returning to FIG. 4, assume again that the maxima I was highly search and interacted with in FIG. 2. Given this interaction, and the 'refine search' button (in one embodiment), FIG. 4 favors all maxima I search results. Out of the 10 web link results that are displayed in this example, the exemplary snap shot 405 illustrates one refined maxima category of category I with various popularity levels of search results represented by the search server on the basis of popularity or context. Basically, FIG. 4 contains a next few popular links, continuing from the first search results page that focuses in on the user-desired maxima I. The first and only maxima category, in this example, contains Maxima Category I, popularity 3 through 8, web links 451 through 456. In this snap shot of the third search result page, dinning establishments such as 'Restaurant XXX' 451, 'Restaurant YYY' 452, 'Restaurant KKY' 453, 'Restaurant YYK' 454, 'Restaurant RRY' 455, and 'Restaurant PPX' 456 are illustrated. Subsequent maxima categories or web links are not shown. Maxima category demarcation illustrated may not necessarily be shown to the user. In essence, the presentation of FIG. 4 to the end user can be structured similarly and processing similarly to that discussed with respect to FIGS. 2-3. FIG. 5 is a schematic block diagram illustrating components of the search server 169 (of FIG. 1) in greater detail, while still being constructed in accordance with the embodiment of FIG. 1. The search server circuitry 507 may, in part or in full, be incorporated into any computing device that is capable of serving as an Internet based server, such as a server 169 in one example. Many different computing devices can search as a server device, not just large computers, but workstations, consumer devices, PCs, clusters of interoperably coupled computers, and portable computing or handheld systems. The search server circuitry 507 generally includes processing circuitry or CPU 509, local storage 517, manager interfaces 549, and network interfaces 541. These components communicatively coupled to one another via one or more of a system bus or other communication media (that can be optimal, wireless, wire line, or another structure), dedicated communication pathways, or other direct or indirect communication pathways. The processing circuitry 509 may be, in various embodiments, a microprocessor, central processing unit (CPU), a digital signal processor, a state machine, an application specific integrated circuit (ASIC), a field programming gate array (FPGA), combinations of these or other circuitry, or other processing circuitry that is capable of directing the search functions taught herein. Local storage 517 may be, in whole or in part or in combination, random access memory (RAM), static random access memory (SRAM), dynamic random access memory (DRAM), read-only memory (ROM), flash memory (such as EEPROM, EPROM, nonvolatile memory, or magnetic-based memory, a disk/hard drive, a RAID array, an optical drive, cache storage, or another type of memory that is operable to store computer instructions and/or data. The local storage 517 includes interaction data gathering module 519, interaction data processing circuitry 521, maxima determination module 523, maxima group (context) list 525, popularity sub-group list 527, search refinement module 529, crawl web page database, web page(s) database 533 and communication applications 535 to facilitate user searches or one or a plurality of users in accordance with the present invention. Note that the modules 519-535 in FIG. 5 may be separate or dedicated software and/or hardware modules. However, it is likely that the modules 519-535 are primarily interwoven or related software routines and/or data within a software program that is generally executed by the CPU 517 and generally stored within memory of some sort within circuitry 507. The interaction data gathering module 519 gathers the user interaction data that includes web links clicked, duration for which web pages opened, type of content visited, geographic or IP address data from info searched, language (English, German, Spanish) data, user profile data, user context and environmental data, time of day, path of links that were followed (the hierarchy that was followed through links by the user), etc. from search support module 595 incorporated in a client device 561 and communicating to the circuitry 507 though AP 559, the ISPN 557 and the Internet backbone 555 in FIG. 5. It is important to note that while FIG. 5 illustrates an Internet-based system, that this system could function within an intranet, local area network, closed network, secure network, and/or other multi-computer systems. The interaction data processing module 521 analyzes the user interaction data gathered by the module 519 and determines the basis upon which maxima categories are either constructed on the fly during a search or selected from among a plurality of pre-existing search stored maxima databases or categorizations. The maxima can be selected or assembled in a hierarchical manner along many different dimensions, (such as a first hierarchy of maxima based on content commonality, with a second category within the first maxima category based on context or popularity). Basically, a hierarchy can be set up prior to user searches or during the user search where web page popularity ranks within these maxima categories are used or constructed. A maxima determination module 523 selects the specific search results within specific maxima categories and popularity ranks determined by module 521. These selected search results are to be displayed in the subsequent search result page based upon the analyses of the interaction data processing module 521. The search refinement module 529 handles the functionalities of the 'refine search' buttons such as providing an option to the user of the client device 549 to allow the search server 507 to use user interaction data and produce a refined search result page that contains fewer number of maxima categories than preceding search result page. In the alternative, the module 529 could be activated for 'next button' operations as well, thereby allowing user-activity-based search results to be woven into the next search pages more (or less) gradually over time. Maxima group list 525 and popularity sub group list 527 are databases that contain lists of maxima groups generated on the basis of context (definitions of search words), popularity, or any other means, and popularity based sorted web pages within these maxima categories, to be displayed in a subsequent search result page(s). It may also contain preceding search result page maxima categories and web pages to be displayed upon clicking 'prev' button. It is important to note that while maxima based on content similarity and a second dimension or category of refinement is taught as popularity within the maxima arrangement, that other method of compartmentalizing the data to enable more refined user searches over time is possible. So, while two dimensions (maxima and popularity) are taught herein, more than two dimensions, hierarchical structures, or characteristics may be used to select what search results are presented to the user. Furthermore, different categorizations schemes and orders other than maxima first and popularity second can be used. One can organize by popularity first, then maxima within popularity. Or, one can use new characterizations like staleness of oldness of the data, type of content (MPEG, PDF, pictures, text, advertisement, etc), geographic location (closeness to your computer's location) or IP address hierarchies, language data, user profile relevance, the context in which the search occurs (in what search space, during what time of day, from work or home, etc), as well as other layers and characteristics of hierarchical organization.

Crawl web page database 531 and web page(s) database 533 contain lists of web pages links that are obtained upon the search server crawling through the web sites during routine collection of web links and pages. Communication applications 535 allow the search server 507 to provide user with pop-up window questionnaires and choices as a part of gathering data that determines user interests and intentions in the searching. This mechanism allows the user to enter specific feedback to the server to guide its processing to find more interesting content for the user in a shorter time. Further, the sever may detect user frustration with the search, and force a pop-up dialogue with the user down a organized and helpful path to force information from the user to the server to improve server understanding of the user's intentions and desires as they pertain to the search. These questionnaires and choices allow user to refine search according to the needs of the user. The network interfaces 541 contain wired and wireless packet switched (or other) interfaces 545 and may also contain built-in or an independent interface processing circuitry 543. The network interfaces 541 allow search server 507 to communicate with one or more client devices such as 561 to initiate local collection or do the actual collection of the user input remotely, and allows the server to deliver search result pages. The manager interfaces 549 may include a display and keypad interfaces. These manager interfaces 549 allow the user at the search server to control aspects of the system. This interface is often used for IT purposes, but can be used for purposes other than system maintenance. The client device 561 that is illustrated is communicatively coupled to the search server 507 via an Internet backbone 555, ISPN 557 and AP 559. In other embodiments, the search server 507 of the present invention may include fewer or more components than are illustrated as well as lesser or further functionality. In other words, the illustrated search server is meant to merely offer one example of possible functionality and construction in accordance with the various embodiments taught herein.

Figure 6:
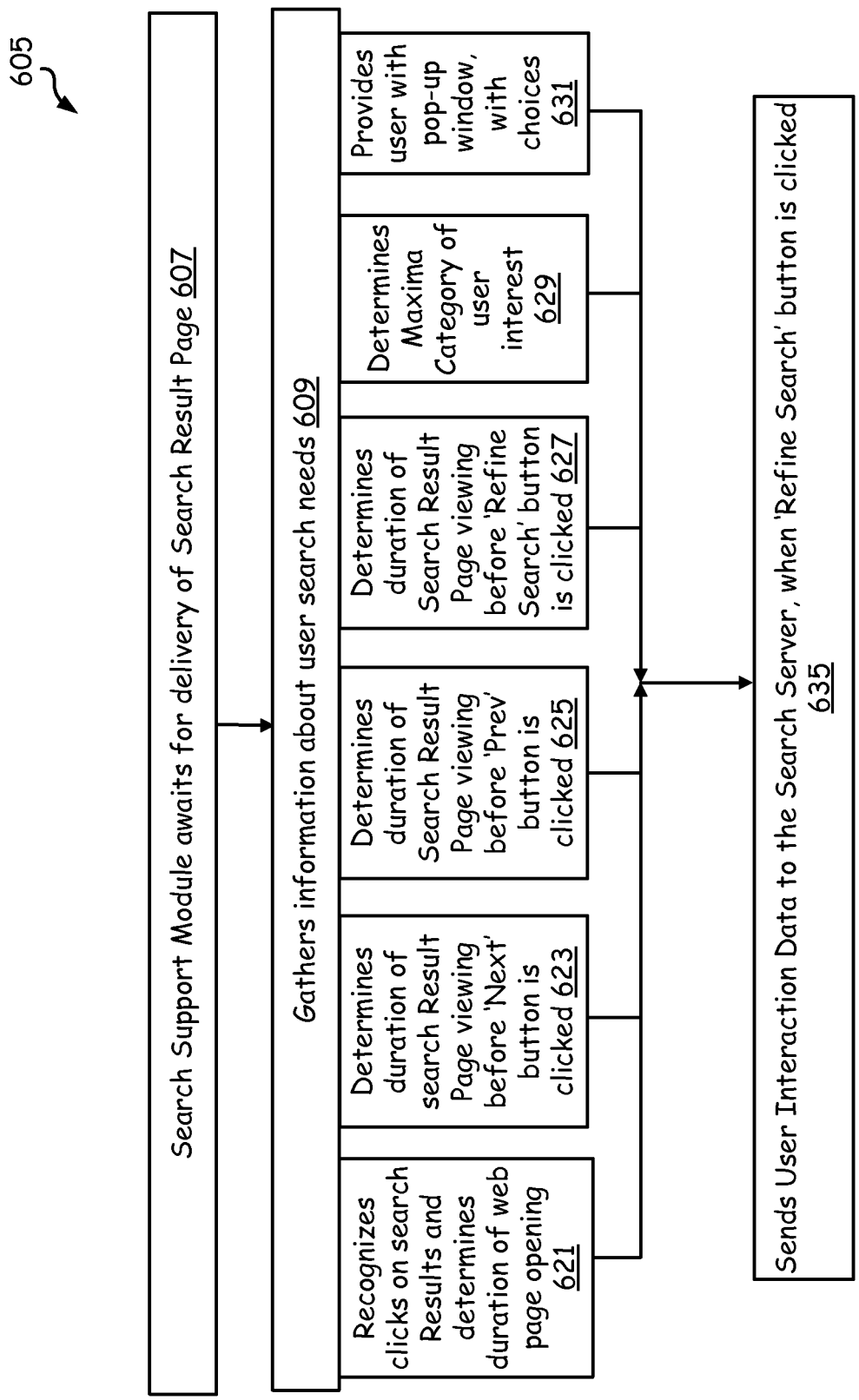
FIG. 6 illustrates, in a logic flow diagram, the functionality of the search support module of FIG. 1, wherein the search support module gathers user interaction data and sends it to the search server.

FIG. 6 is a flow diagram illustrating functionality of search support module(s) 195-196 of FIG. 1. The search support modules gathers user interaction data from their respective computer or computers and sends it to the search server 169 in FIG. 1 upon pressing of 'refine search' button or whenever else the system is programmed to weave user interaction data into new search results displayed to the user. The functionality begins with a search support module of FIG. 1 waiting for delivery of a search result page from the server or another source via a block 607 in FIG. 6. At a next block 609, as soon as the user begins to interact with the delivered search result page, the search support module begins to gather information about user search needs. The gathering of information about user needs occur in one of the many possible ways, some of which are shown in next blocks 621, 623, 625, 627, 629, and 631 in FIG. 3. At a block 621, the search support module recognizes clicks on search results (web links displayed in the search result page) and navigation paths through links as the user looks for content he/she desires. The block 621 can determine the duration for which the web pages, specific, content, or links are opened. This data provides search server information about user intentions, such as what type of web links user is looking for or not looking for, what type of content is "sticky" to the user, or what search patterns or flows lead the user to more valuable content. For example, opening a web link and quick closing of it may inform the search server that user is not interested in that kind of web page, content, or search result. A long duration of opening of web page, on the contrary, with a lot of content viewing and interaction may inform the search server that user is interested in that kind of web page. In another block 623 of FIG. 6, the search support module determines duration of search result page viewing before a 'next' button is clicked or a next operation is performed. A long stay on the current search result page compared to other alternative pages presented may indicate to the search server that the user is interested in the maxima categories that are displayed or related to that search result page. In another block 625 in FIG. 6, the search support server determines the search result page viewing before a 'prev' button is clicked or a previous operation is initiated in another manner. A block 627 illustrates that the search support module can determine the duration of search result page viewing before a 'refine search' button is clicked or a refine search operation is initiated by some other method. Via another block 629 in FIG. 6, the search support module gathers information about user's maxima category of interest. Via block 631, the search support module provides user with pop-up window, providing questionnaires and choices intended to gather user's intentions regarding the current search. For example, if a user enters a search string 'restaurant in ABC city', the pop-up window may provide a list of brief definitions and contexts related to the word 'restaurant' and ask the user exactly what interests the user. These queries may seek to disclose to the user (and obtain feedback on) related content or keywords that were known to the server (via the massive amount of searches performed by the server and correlation of all these searches to each other) by not known to the user at the time. Such is especially useful in areas where vocabulary and context can be complex and require familiarity, where the user may not have that familiarity. Such example include, searches on medical procedures, searches regarding the functions of complex technology products by a consumer, legal matters, international affairs, governmental legislation, etc. At a next block 635, the search support module sends the gathered user interaction data to the search server, when 'refine search' button is clicked.

This information shown in blocks 621-631 is not exhaustive and other data that maybe be collected has been discussed in prior FIGS. 1-5. The information of FIG. 6 is usually gathered in parallel, but can be gathered though other methods. Further, while FIG. 1 and FIG. 6 illustrate the embodiment of user interaction data being collected by the client devices (e.g., devices 155-157 in FIG. 1), it is clear that this information may be collected by the server 169 in FIG. 1 or by another device in the network. For example, the client device may be a dumb terminal or a thin client with little or no application functionality. In this case, the functions set forth in FIG. 6 may be wholly or partially performed by the server 169. In other cases the client device (such as devices 155 and 157 in FIG. 1) are part of a much larger system and a sub-server or workstation in a local network near the client devices 155-157 may take on some or all of the processing set forth in FIG. 6. Also, in other embodiments, various user interaction data may be derived from monitoring and process at least two desirability indicators (and sometimes only one desirability indicator) from among the following choices: a time period a user spends on a page; a time period a user spends reviewing certain content; a type of content viewed by user, link usage by the user, next and back button operations performed by the user, content skipped over by the user, input from the user regarding desirability of content, keywords associated with a search result, and the search criteria. In these cases, a step of using the desirability indicators to determine these characteristics scanning a plurality of the search results to derive desirability numbers for each search result in the plurality of search results and comparing the desirability numbers of different search results to determine which of the scanned search results are desired search results (or interesting search results or maxima versus uninteresting search results or maxima) and therefore more likely to be desired by the user, and presenting information related to those desired search results as output to the user.

Figure 7:
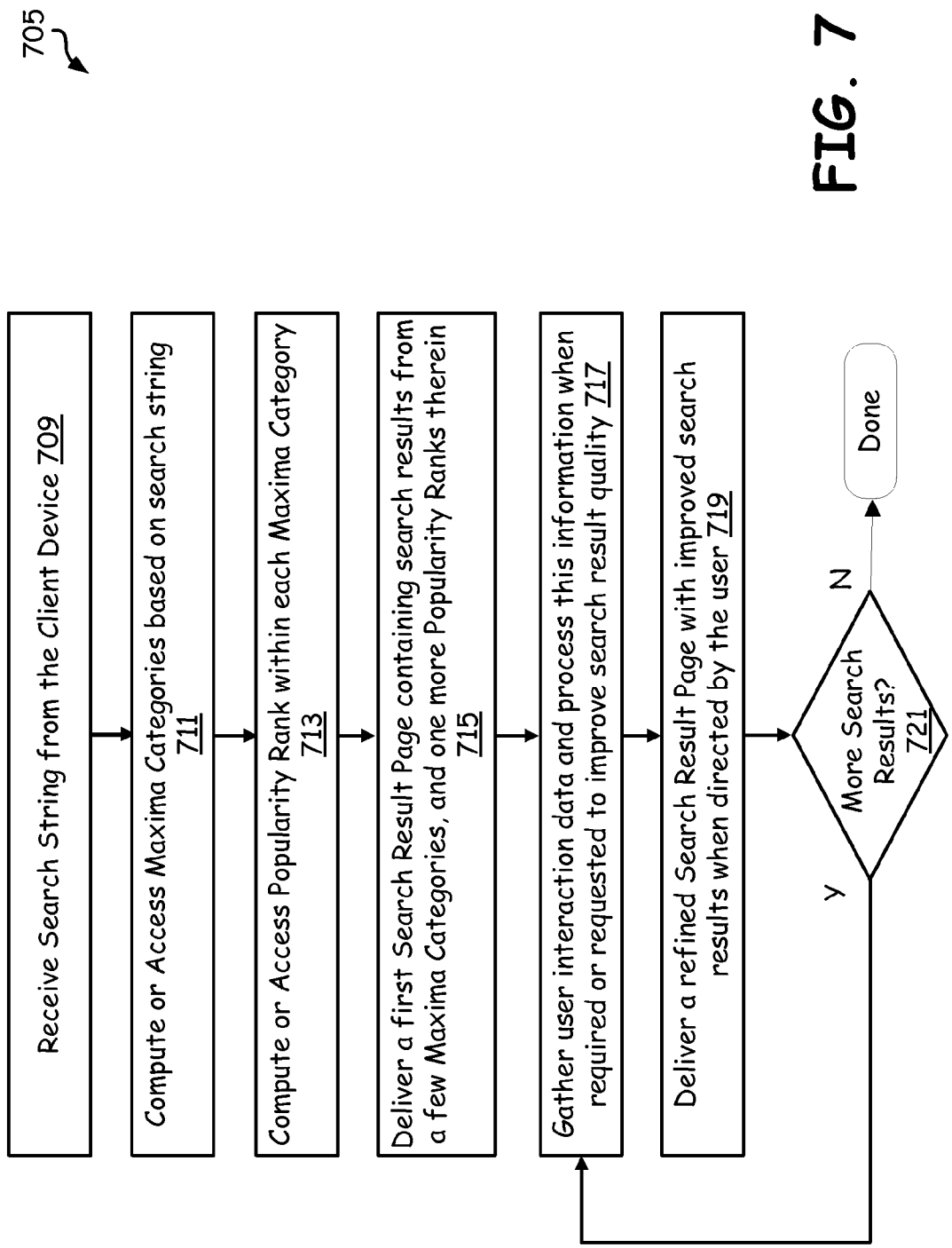
FIG. 7 illustrates, in a logic flow diagram, the functionality of the search server of FIG. 1 upon receiving a search string or other information from the web browser of a client device of FIG. 1.
Figure 8:
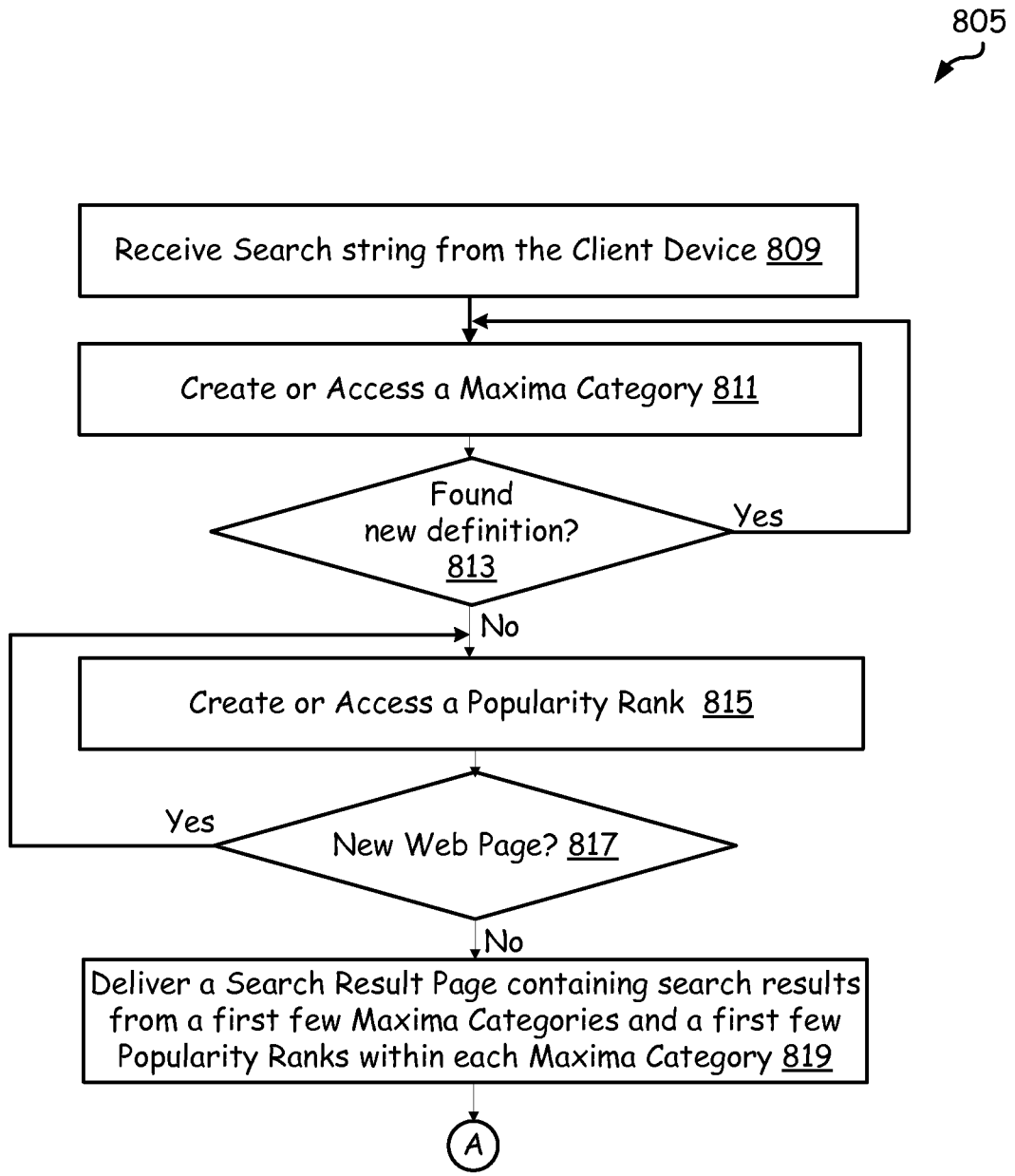
FIGS. 8-9 illustrate, in logic flow diagrams, the functionality of the search server of FIG. 1, in detail.

FIG. 7 is a flow diagram illustrating the functionality of the search server of FIG. 1 upon receiving a search string from the web browser of a client device. The functionality begins at a block 709 when the search server receives a search string from one or more client devices. At a block 711, the search server computes or access pre-existing maxima categories and search results therein based upon the search string. The computation or selection of maxima categories may be based upon definitions and context of words in the search string, based upon popularity, prior similar searches, user profiles, and/or other criteria. At a block 713, the search server computes or scans pre-existing popularity ranks within each of the maxima categories for search results associated therewith. At a next block 715, the search server delivers a first result page containing first few maxima categories, each containing first few popularity links selected based upon a high correlation to those search pages being of interest to the user given search strings, keywords, etc. For example, the search string may be processed and analyzed against thousands of maxima with thousands or more of popularity indices therein and result in a selection of maxima category 1 containing 3 web links or search results sorted and provided on the basis of popularity, 2 web links from maxima category 2 and 1 from each of maxima categories 3-7 as shown in FIG. 2. At a block 717, the search server gathers user interaction data all the time in the background, upon 'refine search' button click, upon a 'next' button click (if the next button is programmed with this functionality), or some other method. At a next block 719, the search server delivers a second refined second search result page with refined search results per the information collected in step 717 or through normal search result presentation without user interaction data analyzed depending upon how the 'next' button is functionally enabled dynamically or statically, or based on 'refine search' button clicks. For example, when interaction data is enabled and used, if the user interaction data shows that the user does not interact with any of the results, the second search result page will move on to substantially all new search results and therefore may contain 1 hit from each of remaining maxima categories 8-12, 2 from maxima category 1, 1 from maxima categories 2, 3 and 4. Any interest or certain user interaction or lack of interaction might cause a modified second search result page to be delivered. A selection and very quick window closure might actually identify a lack of interest that is used to decrease the likelihood that such maxima are displayed, for example. Step 721 in FIG. 7 illustrates that the search process of FIG. 7 is iterative and/or recursive and can be repeated any number of times from 1 to some finite number N by the user or a group of users. FIG. 8 is a flow diagram illustrating the functionality of the search server 169 of FIG. 1, in detail. FIG. 8 operations in conjunction with FIG. 6 in most embodiments, as the processing in FIG. 8 with usually require some sort of collection and reception of user interaction data as previously discussed. The functionality of the search server 169 (of FIG. 1) begins at a block 809 in FIG. 8, when the search server receives a search string or processed information/data related to the search string from the client device(s). At a next block 811, the search server creates a maxima category related to the search and corresponding to search results that are available in the search space, or the server simply accesses the maxima data structures already set up by the server as search results are collected or identified within the Internet or intranet. In the embodiment where the maxima is created in response to a search entry, the maxima category is created on the basis of context by identifying definitions of the words in the search string or data related to the search string, and sorting computer data and/or search results on the basis of popularity within maxima categories. In other embodiments, maxima categories may be identified and sorted on the basis of popular user search patterns alone. In yet other embodiments, multiple hierarchical tiers of categories may be used, such as content-based maxima, popularity within maxima, time duration, or age within popularity, and language or geographic location within time duration. At a next decision block 813, the search server identifies a new definition of a word in the search string. If one more search definition is found at the decision block 813, then one more maxima category is created at the block 811 in an iterative manner. If more maxima creation opportunities are not found, a web page or search result is identified that belongs to one of the maxima categories and a popularity rank is associated with this web page, at a next block 815. At a next decision block 817, the search server identifies a new web page that belongs to one of the maxima categories. If one more web page or search result is found at the decision block 817, then one more popularity rank is created at the block 815. At the end of all this iterative processing, large numbers of search results and/or web pages have been processed and assembled into a relevant search list on the basis popularity rank, where the popularity rank is hierarchically within each maxima category that was defined, identified, or created. This process of creating maxima categories, identifying web pages that belong to each of these maxima categories, and sorting on the basis of popularity continues until all of the web pages or search results that belong to or highly correlated to some sufficient level with the search string are identified. At a block 819, the search server delivers a search result page containing first few maxima categories and first few popularity ranks within each of these maxima categories. For example, in another embodiment based upon popular searches, the search server may receive a search string such as "car." The search server creates maxima category for the search word "car" with 'cars for rent' as of top priority, 'cars for sale' as of a lesser priority, 'websites of car manufacturers' as of a still lesser priority and so on. In this embodiment, the maxima categories are identified by finding correlation between pages and through tracking prior user search interactions identified based on past search selections and sorted on the basis of popularity. Within these maxima, like 'cars for rent', there can be sub-maxima such as 'car rental dealers' (e.g., Hertz, Fox, Enterprise), 'types of cars that can be rented', 'locations for rentals', 'pricing of rentals', etc. Some data sources or search results can fall into multiple maxima categories in one embodiment. Then, within each of these maxima categories, the search server identifies web pages and sorts them on the basis of popularity in one embodiment. After this step, the search result page is delivered at the block 819 and may contain in the 'cars for rent' maxima category, with possibly three most popular results associated, followed by two most popular hits from the 'cars for sale' maxima category, and one from each of the subsequent more popular maxima, all depending upon how high these maxima, popularities, and the like correlated with the search input/string and other indicators of what the user may desire. Within each of these maxima, the search server delivers the web site listing based on web page popularities.

Figure 9:
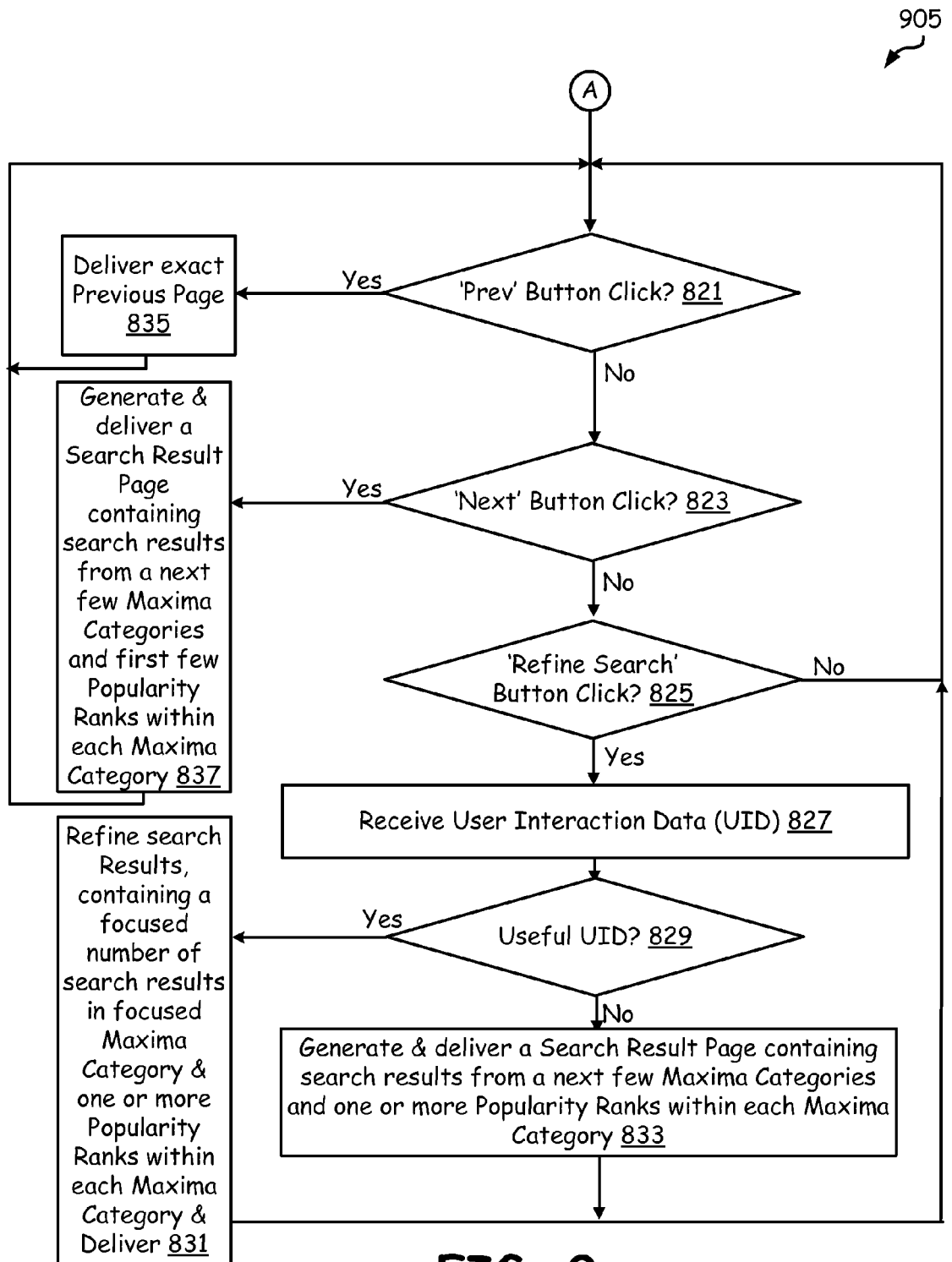

In other words, in one embodiment, the server processes search result to categorize them into common maxima content themes. The server then tries to determine which of content themes or maxima creates highly correlate to the search terms. In doing so, the sever made need to correlate search terms to other terms found in search results or interrelated in various search results clustered into one maxima. Therefore, the tasks of constructing and cross-correlating the maxima and related the maxima to the search terms is iterative and can result many level of hierarchical calculations. In another embodiment, it is understood that this process may be very compute intensive, and therefore the categorizing and compartmentalization of data items, search results, web pages, etc should be accomplishing in a macro sense before search terms are entered. Meaning, in this embodiment, when the user enters a search string, the computer already knows all the search maxima and popularity categories out there (at least partially) and can select among this data and these data structures rather than generating all the maxima and popularity data on the fly as searches come into the server. FIG. 9 is a flow diagram illustrating the functionality of the search server of FIG. 1, continued from FIG. 8. The continued functionality of search sever begins with the operation of the search support module at the client device. These search support modules gathering user interaction data while the user interacts with the delivered search result pages. At a next decision block 821, the search server determines if the 'prev' button is clicked. If yes, an exact previous page of search results (delivered previously by the server) is delivered at a next block 835, and the search server waits for the subsequent clicking of a button or following interaction from the user to be captured. If the 'prev' button is not clicked at the decision block 821, the search server determines if the 'next' button is clicked at a next decision block 823. If yes, meaning that the 'next' button was clicked, the search server generates (if not already generated) and delivers a new search result page containing next few maxima categories (continued from the preceding search result page) and first few popularity ranks within each of these maxima categories, at a next block 837, and the search server waits for the subsequent clicking of a button. As already discussed, this 'next' feature can be wired to provide search results subject to normal processing that does not involve user interaction, or may weave partial (to some non-zero but less than 100% degree) or all interaction data into the formulation of the next search results page. If 'next' is not entered at the decision block 823, the search server determines if the 'refine search' button has been clicked via a decision block 825. If the 'refine search' button is not clicked, then the search server waits for the subsequent clicking of a button while continuing to monitor user interaction with the search results, browser, and system. If yes, meaning the 'refine search' button was clicked, the search server receives user interaction data from the search server (if it has not already been streaming to the server for temporary storage in anticipation of future use), via a next block 827. At a next decision block 829, the search server determines if the user interaction data (UID) contains any useful information that can be used to deduce user interests, desires, or intents within current search activity. If no useful information is found, the search server generates (if not already generated) and delivers a new search result page containing next few maxima categories (continued from the preceding search result page) and first few popularity ranks within each of these maxima categories, at a next block 833, and the search server waits for the subsequent clicking of a button. If yes is determined at the decision block 829, the search server refines the search results on the basis of user interaction data and delivers a new search result page containing fewer or more focused maxima categories (selected from the maxima categories correlated to or interacted with heavily from the preceding search result page) and next few popularity ranks within each of these maxima categories via a next block 831. Then, iteratively, the search server waits for the subsequent clicking of a button while again monitoring more user interaction and data. Continuing from the example of FIG. 8, if the user interacts with any of the abbreviated or linked search results or offerings, such as from the maxima category 'cars for rent', the search support module records that event and subsequently upon pressing of 'refine search' button sends this user interaction data to the search server (if not already there and stored/cached in anticipation of this event). Such user interaction within the maxima category and specific search results within 'cars for rent' is also timed, that is, the search support module also records how long the user interacted with any of the briefed offerings, maxima as a whole, specific search results, results within the search results (links), or any specific content within a search result. Further vectors associated with that interaction are also recorded by the search support module as discussed elsewhere herein. For example, if a user selects one brief description that opens then selects a hypertext link on that page, the search support module records that vector or "link following" and duration of the visit on sub-links or sub-content to aid in subsequent search result processing. When the user returns to the search results page and clicks on 'refine search' button, all of the activity recorded is used to tailor the subsequent search result pages. This tailoring can be partially woven into the standard methods of returning search results, and may not be the information or process used to derive all of the search results. Therefore, the refined search result page that contains 10 total search result summaries, links, or identifiers, may contain a next 5 web pages from the 'cars for rent' maxima category that were generated through analysis of user interaction, for example, and another 5 search results using a traditional approach. As the user continues through the results and clicks on 'refine search' button, the search server provides ever further tailoring of 50% or so of the results on a given page, so the improvement in quality search items should iteratively improve over time, depending upon the percentage of impact the user interaction has or doesn't have on future search results that are presented, and this percentage can be user controlled, client-controlled, and/or server-controlled. The terms "circuit" and "circuitry" as used herein may refer to an independent circuit or to a portion of a multifunctional circuit that performs multiple underlying functions, and may include software or data that are needed in order to render the circuitry operable. For example, depending on the embodiment, processing circuitry may be implemented as a single chip processor/CPU or as a plurality of processing chips and discreet electronics. Likewise, a first circuit and a second circuit may be combined in one embodiment into a single circuit or, in another embodiment, operate independently, perhaps in separate chips. The term "chip," as used herein, refers to an integrated circuit or any other monolithic or close-proximity collection of electrical components. Circuits and circuitry may comprise general or specific purpose hardware, or may comprise such hardware and associated software such as firmware or object code. As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module either does not or can modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled." The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Therefore, the steps taught here for one device (e.g. client side) may be performed by another device (e.g., the server), and vice versa. Further, the steps delineated as performed in a certain manner or by a certain piece of hardware or software may actually be split in parts and done in different physical locations or different system elements. The present invention has been described above with the aid of functional building blocks illustrating the performance of certain significant functions. The boundaries of these functional building blocks have been illustrated and defined for convenience of description and to enable one or more specific embodiments. Alternate boundaries could be defined as long as the certain significant functions are appropriately performed. Similarly, flow diagram blocks may also have been arbitrarily defined herein to illustrate certain significant functionality, order, and flow. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof. Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:
1. A computing device comprising:
a communication interface;
memory; and
processing circuitry coupled to the communication interface and to the memory, the processing circuitry, memory, and communication interface operable to:
receive a search request from a user device, the search request including a search string;
determine first search results using the search request, the search results selected from a maxima category wherein the maxima category groups searchable data based on content similarity and relative popularity wherein the maxima category contains hierarchically ordered sub-maxima categories that further organize the searchable data within the maxima category based on content similarity;
deliver the first search results to the user device;
receive user interaction data from the user device indicating user interaction with a search result included in first search results and a hierarchically ordered sub-maxima category included in the first search results;
process the user interaction data to identify second search results by favoring search results within interesting maxima categories that are identified as interesting;
deliver the second search results to the user device; and
iteratively repeating processing the user interaction data and selecting other sets of search results from interesting maxima and eliminating search results from uninteresting maxima so increasingly more meaningful search results are returned over time.

2. The computing device of claim 1, further comprising:
wherein the user interaction data comprises answers to a pop-up window questionnaire.

3. The computing device of claim 2, wherein the processing circuitry is further operable to:
provide the pop-up window questionnaire to the user in response to detecting user frustration with the search results.

4. The computing device of claim 1, wherein the processing circuitry is further operable to:
allocate a first portion of the search results to search results selected based on a type of content the user is determined to be attracted to; and
allocate a second portion of the search results to search results selected based on a type of content correlating to search terms.

5. The computing device of claim 1, wherein the processing circuitry is further operable to:
generate the maxima categories based on user interaction data collected from a search support module installed in one or more user devices.

6. The computing device of claim 1, wherein the maxima category changes over time as a plurality of users interact with the searchable data.

7. The computing device of claim 6, wherein the user interaction data comprises a number of hit opportunities associated with a given maxima category.

8. The computing device of claim 1, wherein the processing circuitry is further operable to:
select search results from multiple different maxima category groups based on a popularity of the maxima groups relative to each other.

9. The computing device of claim 1, wherein the processing circuitry is further operable to:
provide information indicating an association between a maxima group and a particular search result to the user device, wherein the user device is configured to display the maxima group in conjunction with the particular search result.

10. A method of identifying search results based on a search request from a user device, the method comprising:
receiving, at a computing device configured to implement a search server, the search request from the user device, the search request including a search string, via a communications network;
selecting first search results from a maxima category, wherein the maxima category includes searchable data grouped according to both content similarity and relative popularity, and wherein the searchable data included in the maxima category is hierarchically ordered into sub-maxima categories based on content similarity;
delivering the first search results to the user device via the communications network;
receiving user interaction data from the user device indicating user interaction with a search result included in the first search results and a hierarchically ordered sub-maxima category included in the first search results;
processing the user interaction data to identify second search results by favoring search results within interesting maxima categories that are identified as interesting;
delivering the second search results to the user device; and
iteratively repeating processing the user interaction data and selecting other sets of search results from interesting maxima and eliminating search results from uninteresting maxima so increasingly more meaningful search results are returned over time.

11. The method of claim 10, further comprising:
wherein the user interaction data comprises answers to a pop-up window questionnaire.

12. The method of claim 11, further comprising:
providing the pop-up window questionnaire to the user in response to detecting user frustration with the search results.

13. The method of claim 10, further comprising:
allocating a first portion of the search results to search results selected based on a type of content the user is determined to be attracted to; and
allocating a second portion of the search results to search results selected based on a type of content correlating to search terms.

14. The method of claim 10, further comprising:
generating the maxima categories based on user interaction data collected from a search support module installed in one or more user devices.

15. The method of claim 10, wherein the maxima category changes over time as a plurality of users interact with the searchable data.

16. The method of claim 15, wherein the user interaction data comprises a number of hit opportunities associated with a given maxima category.

17. The method of claim 10, further comprising:
selecting search results from multiple different maxima category groups based on a popularity of the maxima groups relative to each other.

18. The method of claim 10, further comprising:
providing information indicating a maxima group associated with particular search results to the user device, wherein the device is configured to display the maxima group in conjunction with the particular search result.

* * * * *